May 31, 1949.  A. J. GRANBERG  2,471,951
STRAINER
Filed March 4, 1944  2 Sheets-Sheet 1
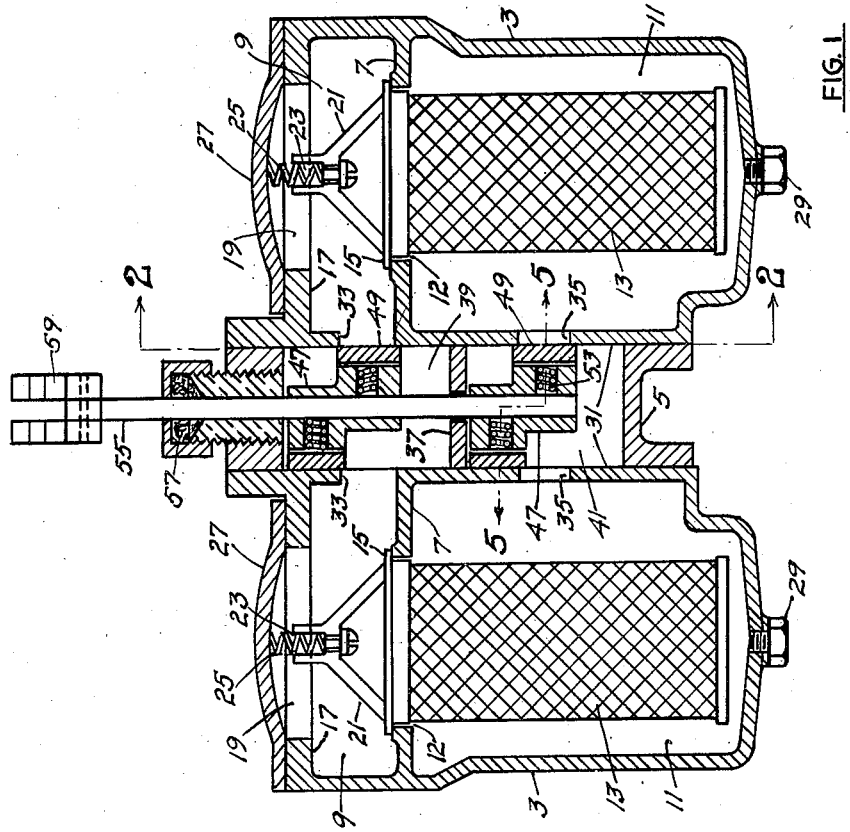
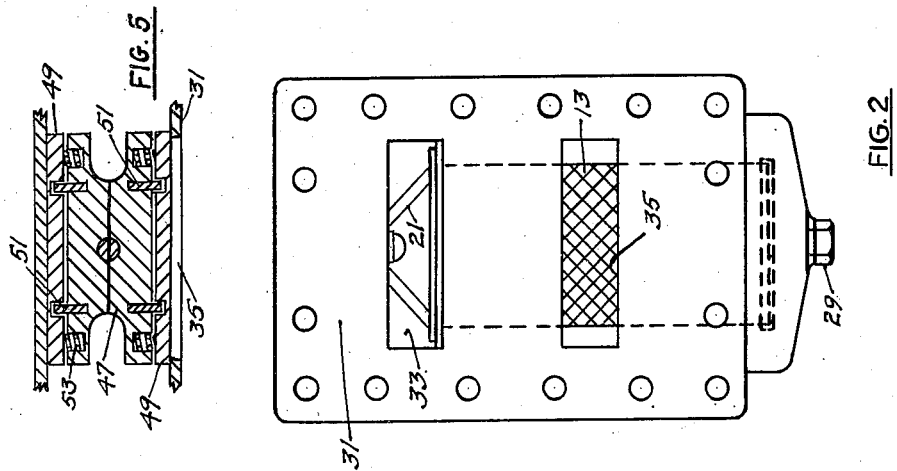
INVENTOR
ALBERT J. GRANBERG
BY Lippincott + Metcalf
ATTORNEYS

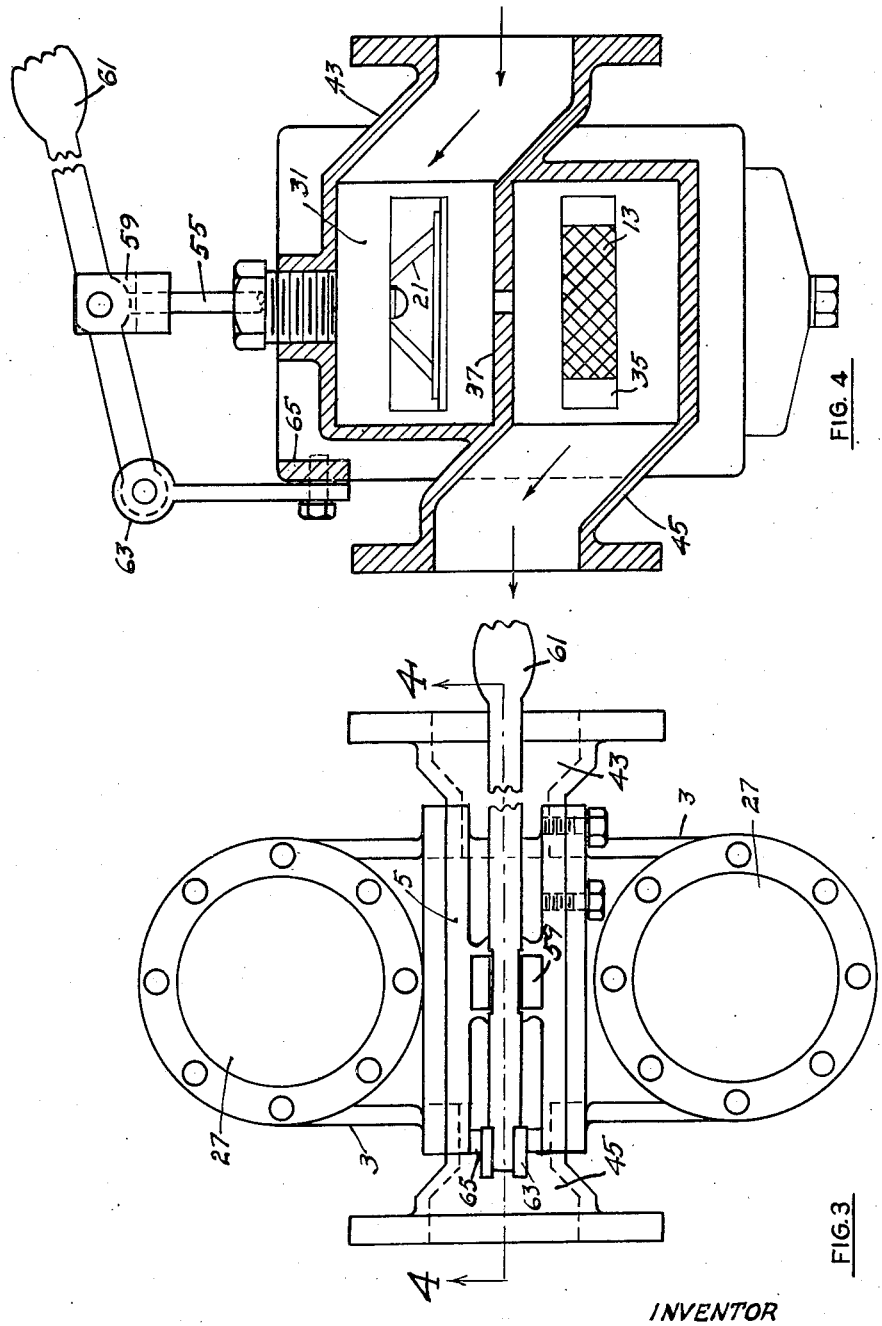

Patented May 31, 1949

2,471,951

UNITED STATES PATENT OFFICE 2,471,951

STRAINER

Albert J. Granberg, Oakland, Calif.

Application March 4, 1944, Serial No. 525,057

3 Claims. (Cl. 210—168)

My invention relates to strainers, and more particularly to strainers of the duplex type applicable for use in fuel systems.

It is conventional practice in a fuel supply system such as employed in the dispensing of gasoline, to provide a strainer at some point in the line, preferably adjacent the meter, to remove foreign matter from the liquid before it flows into the meter and out of the discharge nozzle. Duplex strainers have been employed for this purpose as they enable one strainer to be cleaned while the other is functioning, thus permitting of maintained operability of the system.

My invention relates to such a strainer, and among the objects thereof are:

1. To provide a novel and improved strainer of the duplex type;
2. To provide a novel and improved strainer of the duplex type embodying a switching valve having large valve openings and characterized by ease of operation;
3. To provide a novel and improved strainer of the duplex type which permits of full flow openings into and out of the strainer basket compartment;
4. To provide a novel and improved strainer of the duplex type characterized by simplicity of design and construction.

Additional objects of my invention will be brought out in the following description of a preferred embodiment of the same, taken in conjunction with the accompanying drawings, wherein—

Figure 1 is a view in section through a duplex strainer of my invention in its preferred form;

Figure 2 is a view taken in the direction of the plane 2—2 of Figure 1;

Figure 3 is a top plan view of the embodiment of Figure 1;

Figure 4 is a view in section taken in the plane 4—4 of Figure 3;

Figure 5 is a view in section through a portion of the valve assembly in the planes 5—5 of Figure 1.

Referring to the drawings for a detailed description of the preferred embodiment of my invention, the duplex strainer illustrated therein comprises a symmetrical casing involving a pair of similar strainer sections 3 separated by a flanged spacer 5 to which the strainer sections are preferably bolted.

Each strainer section has a horizontal partition 7 dividing the same into a relatively small upper chamber 9 and a substantially larger lower chamber 11. The partition is provided with an opening 12 to receive a cylindrical shaped strainer basket 13 which at its upper end is formed with a flange 15 to rest upon the partition and be carried thereby. The roof 17 of the section has a similar but slightly larger opening 19 in alignment to facilitate insertion and removal of the strainer basket.

The strainer basket is closed at its lower end and open at its upper end, and to this end is affixed a spider 21 which is provided with a central axial recess 23 to receive a compression spring 25.

A cover 27 which is preferably bolted over the roof opening 23, compresses such spring and serves to anchor the strainer basket in position.

The lower end of each strainer section is of sump formation and provided with a threaded drain opening normally closed with a suitable threaded closure 29.

While each strainer section is for the most part substantially cylindrical in shape, it presents a smooth planar wall 31 to the spacer 5, in which wall there is provided a pair of ports 33 and 35, one communicating with the upper chamber 9 and the other communicating with the lower chamber 11.

This spacer 5 is provided with a horizontal dividing partition 37, and in conjunction with the planar walls 31 of the strainer sections, the spacer forms an upper valve chamber 39 and a lower valve chamber 41. The upper valve chamber is in communication exteriorly of the device through an inlet flanged extension 43, while the lower chamber is in communication with the exterior of the device through a discharge flanged extension 45.

The ports of each strainer section are adapted to be selectively valved off by means of a valve assembly comprising a pair of duplex valve elements 47, one in each valve chamber, in slidable engagement between the planar walls 31.

Each duplex valve element is provided with vertically displaced valve shoes 49 preferably of hardened steel, such shoes being slidably mounted on dowel pins 51 set into the body portion of the valve element, and urged against the adjacent walls 31 by springs 53 carried by the body portion and bearing against the valve shoes.

The duplex valve elements are affixed to a central stem 55 passing through the partition 37 and a gland 57 in the upper wall of the spacer. This stem at its upper end terminates in a yoke 59 to pivotally receive a valve operating handle 61 which at one end is connected to a fulcrum 63 mounted on a crosspiece 65 at an upper corner of the spacer.

By reason of the planar character of the walls 31, the upper and lower ports can be similar in area and each sufficiently large to accommodate the full flow of the system in which the strainer may be incorporated. Of course, the valve shoes 49 are of slightly larger area to close off their associated ports and are so spaced that both ports of a strainer section will be closed off simultaneously while the others are substantially fully exposed to the flow of the system. Thus, each strainer basket is capable of being disconnected from the system for purposes of cleaning or repair, while the other basket strainer maintains the system in operative condition.

To assure proper closing off of either strainer section, without necessitating the exercise of judgment and care on the part of an operator, each valve chamber may be of a height such that the upper and lower walls will function as abutments to fix the limits of permissive movement of the handle in the matter of shifting the valve elements.

The embodiment of my invention described above fulfills all the objects of my invention as previously set forth and while I have described such embodiment in detail, the same is subject to modification and alteration without departing from the fundamental features thereof, and I accordingly do not desire to be limited in my protection to the details described, except as may be necessitated by the appended claims.

I claim:

1. A strainer of the duplex type comprising a pair of spaced strainer sections, each section having a planar wall facing the other section and provided with an inlet port and a discharge port; a strainer basket in each section; a valve section intermediate said strainer sections and including a valve chamber in communication with said strainer baskets through said inlet ports and another valve chamber in communication with said strainer baskets through said discharge ports; an inlet connection leading to that valve chamber which is connected with said inlet ports and a discharge connection leading from that valve chamber which is connected with said discharge ports; and a valve assembly in said valve section including a duplex valve element in said valve chamber associated with said inlet ports and having port valving portions in slidable engagement with said planar walls with the port valving portions displaced with respect to each other in the direction of movement of said valve assembly to effect the closing of only one inlet port at a time, a corresponding valve element in said other valve chamber, and means for simultaneously shifting said valve elements.

2. A strainer of the duplex type comprising a pair of spaced strainer sections divided into inlet and outlet chambers, each section having a planar wall facing the other section and provided with an inlet port in communication with said inlet chamber and an outlet port in communication with said outlet chamber in such section; a strainer basket in one of the chambers of each strainer section and exposed to the other chamber of such section; a valve section intermediate said strainer sections and including a valve chamber in communication with an inlet chamber in each chamber section through the inlet ports in the planar wall of each section, and a valve chamber in communication with the outlet chamber of each strainer section; an inlet connection to said first mentioned valve chamber and a discharge connection from said last mentioned valve chamber; and a valve assembly in said valve section including a duplex valve element in said first valve chamber having port valving portions in slidable engagement with said planar walls with the port valving portions displaced with respect to each other in the direction of movement of said valve assembly to effect the closing of only one inlet port at a time, a corresponding valve element in said other valve chamber, and means for simultaneously shifting said valve elements.

3. A strainer of the duplex type comprising a pair of spaced strainer sections divided into inlet and outlet chambers, each section having a planar wall facing the other section and provided with an inlet port in communication with said inlet chamber and an outlet port in communication with said outlet chamber; a strainer basket in each outlet chamber and exposed to an inlet chamber; a valve section intermediate said strainer sections and including an inlet valve chamber in communication with said inlet chambers through said inlet ports, and an outlet valve chamber in communication with said outlet chambers through said outlet ports; an inlet connection to said inlet valve chamber and a discharge connection from said outlet valve chamber; and a valve assembly in said valve section including a duplex valve element in said inlet valve chamber having port valving portions in slidable engagement with said planar walls with the port valving portions displaced with respect to each other in the direction of movement of said valve assembly to effect the closing of only one inlet port at a time, a corresponding valve element in said outlet valve chamber, and means for simultaneously shifting said valve elements.

ALBERT J. GRANBERG.

REFERENCES CITED

The following references are of record in the file of this patent:

UNITED STATES PATENTS

| Number | Name | Date |
| --- | --- | --- |
| 1,042,203 | Dahl | Oct. 22, 1912 |
| 1,685,303 | Voorheis | Sept. 25, 1928 |
| 1,919,031 | Muhleisen | July 18, 1933 |
| 1,965,368 | Burnish | July 3, 1934 |
| 2,019,169 | Backlund | Oct. 29, 1935 |